Dec. 14, 1937.  P. A. EDWARDS ET AL  2,102,259
PIPE CUTTING AND WELDING BENCH
Filed Oct. 9, 1936  10 Sheets—Sheet 1
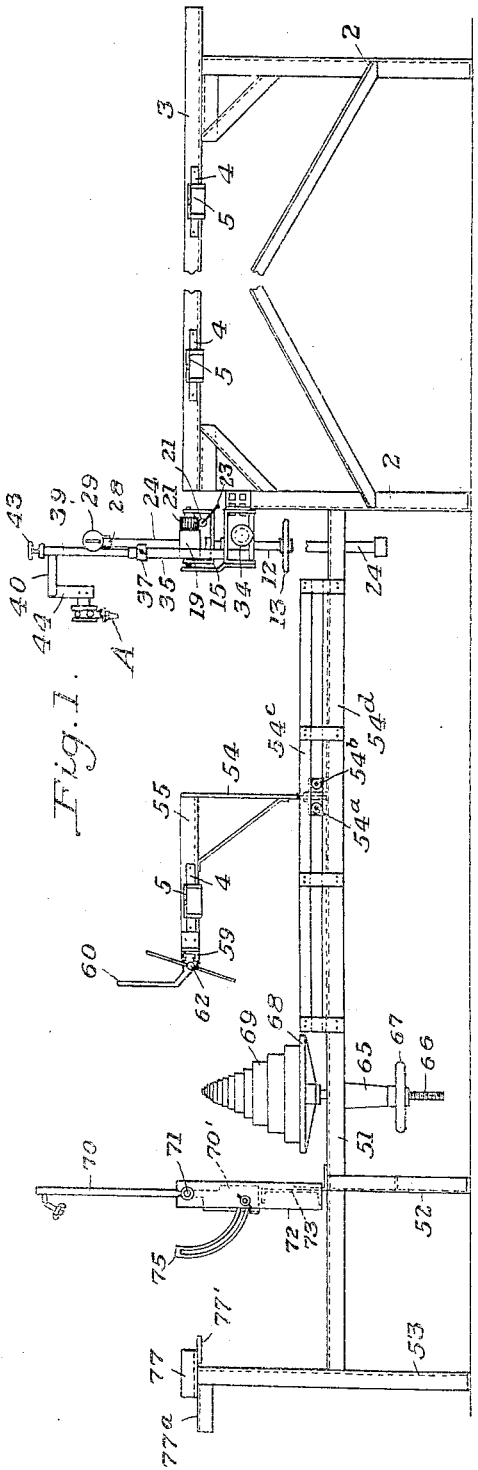
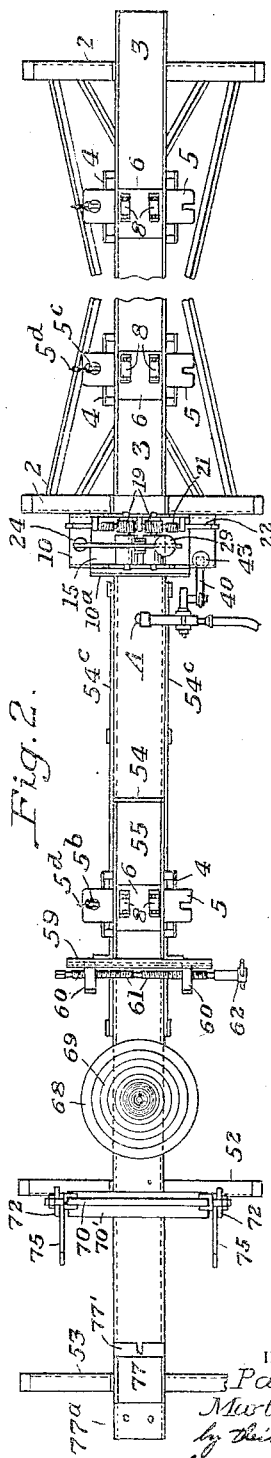
INVENTORS
Paul A. Edwards
Martin C. J. Gross
by their attorneys

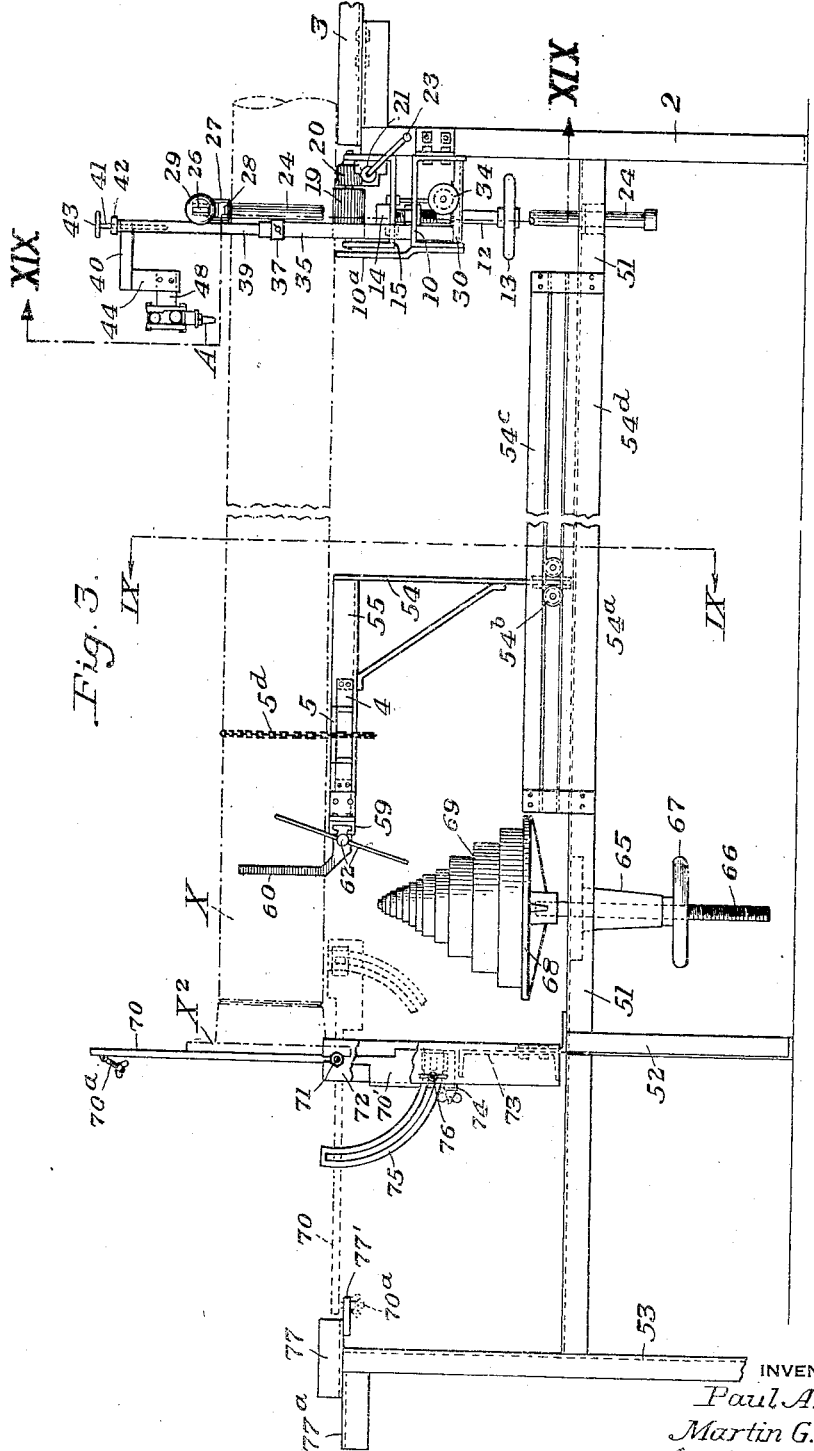

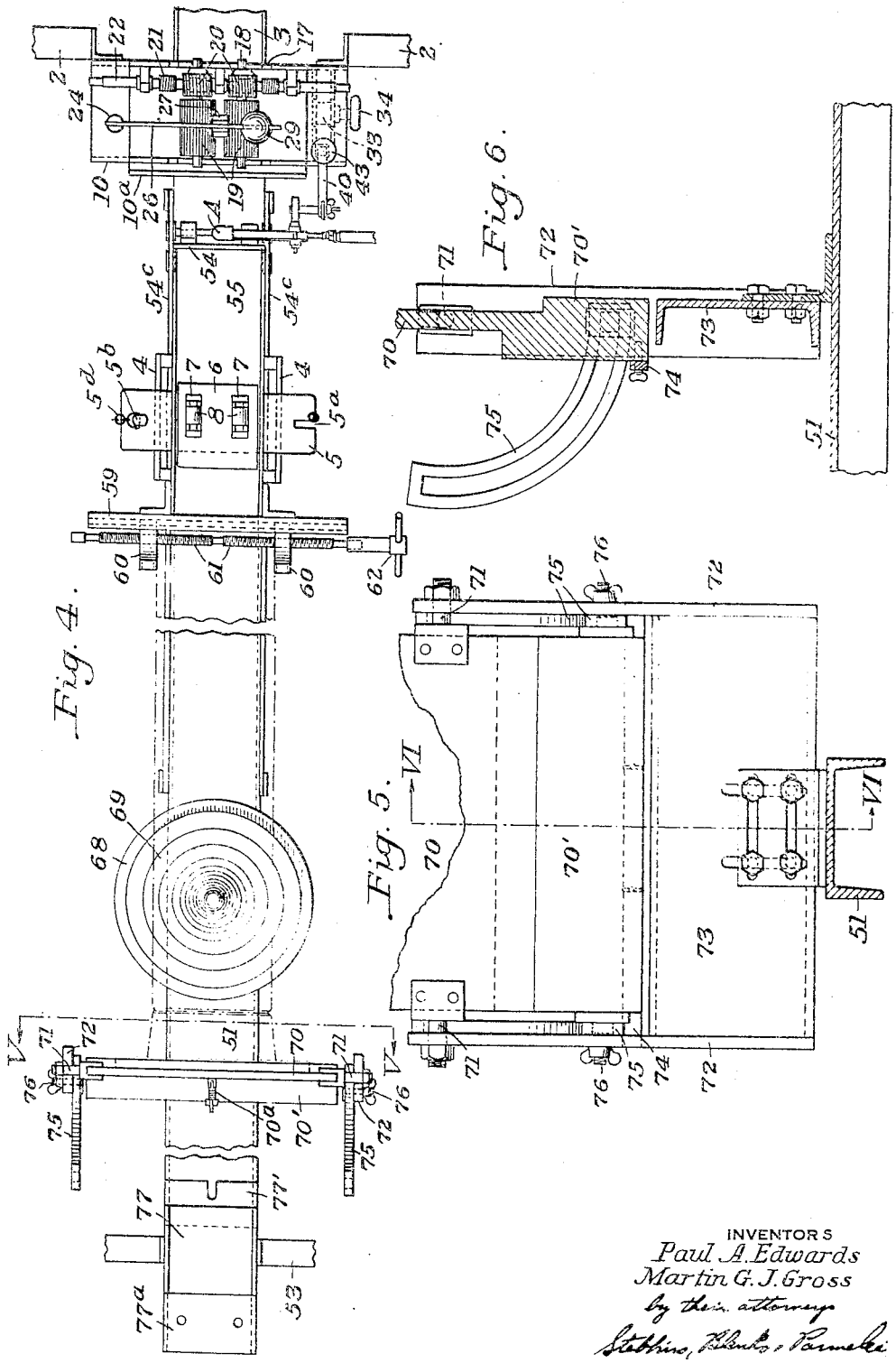

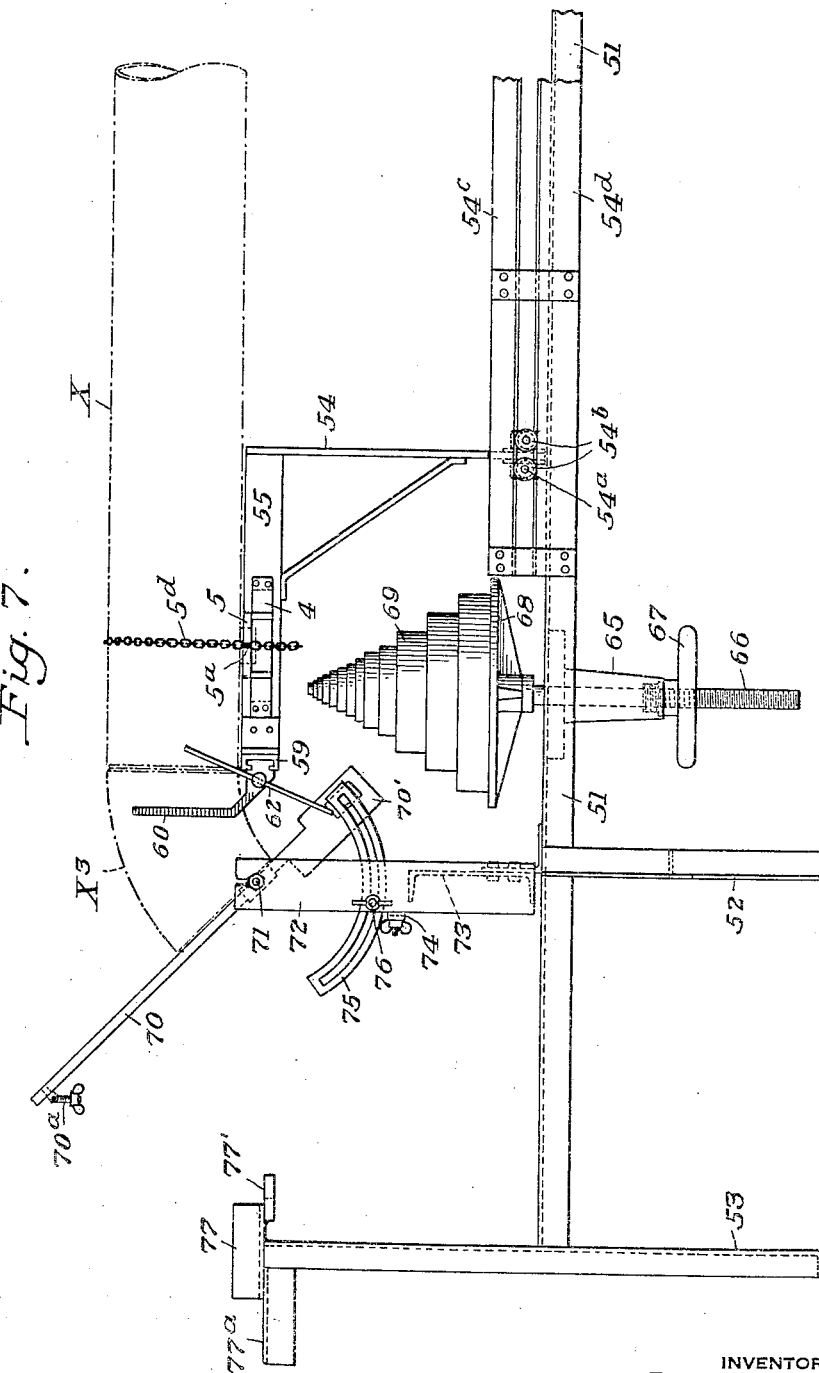

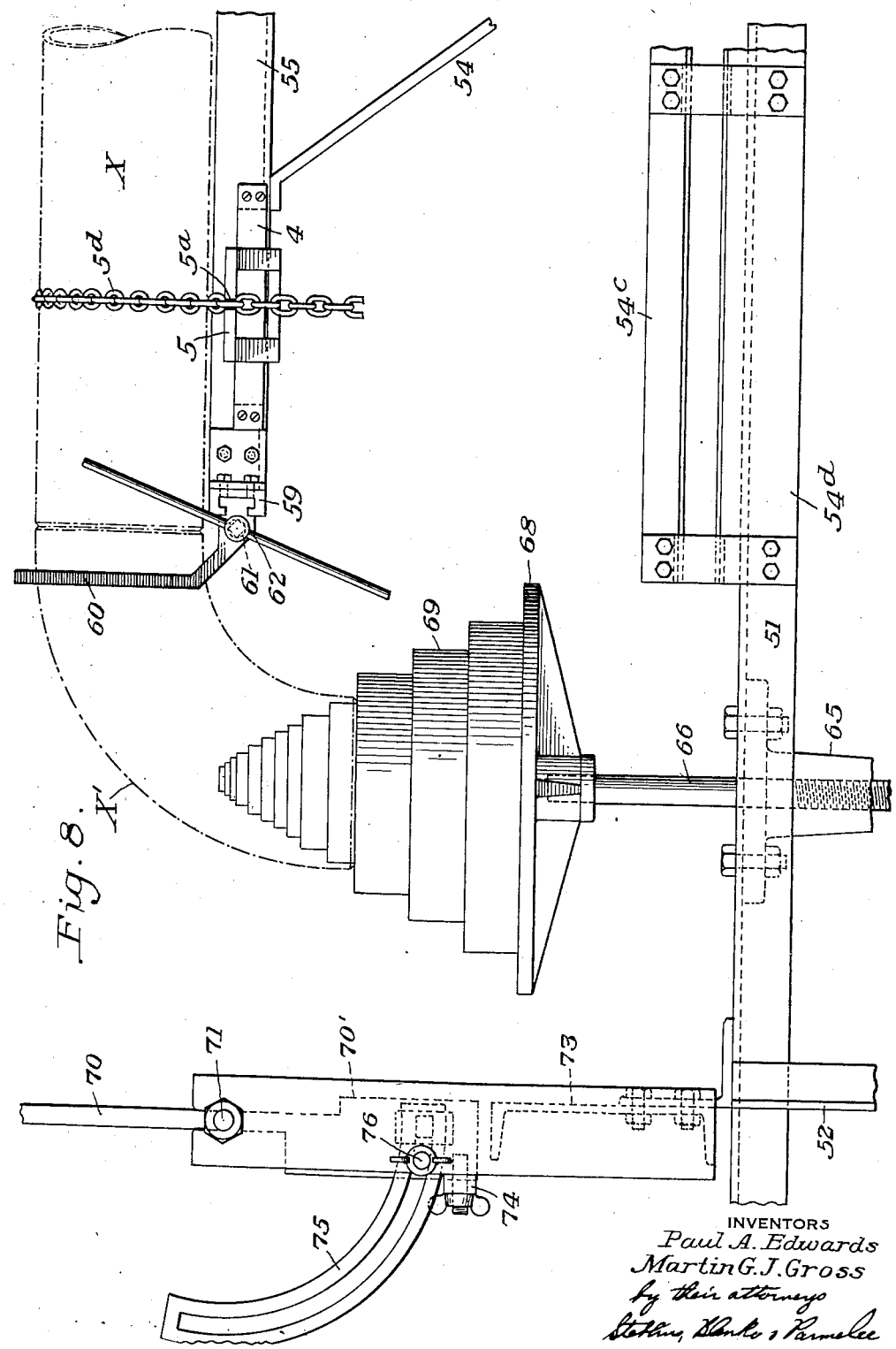

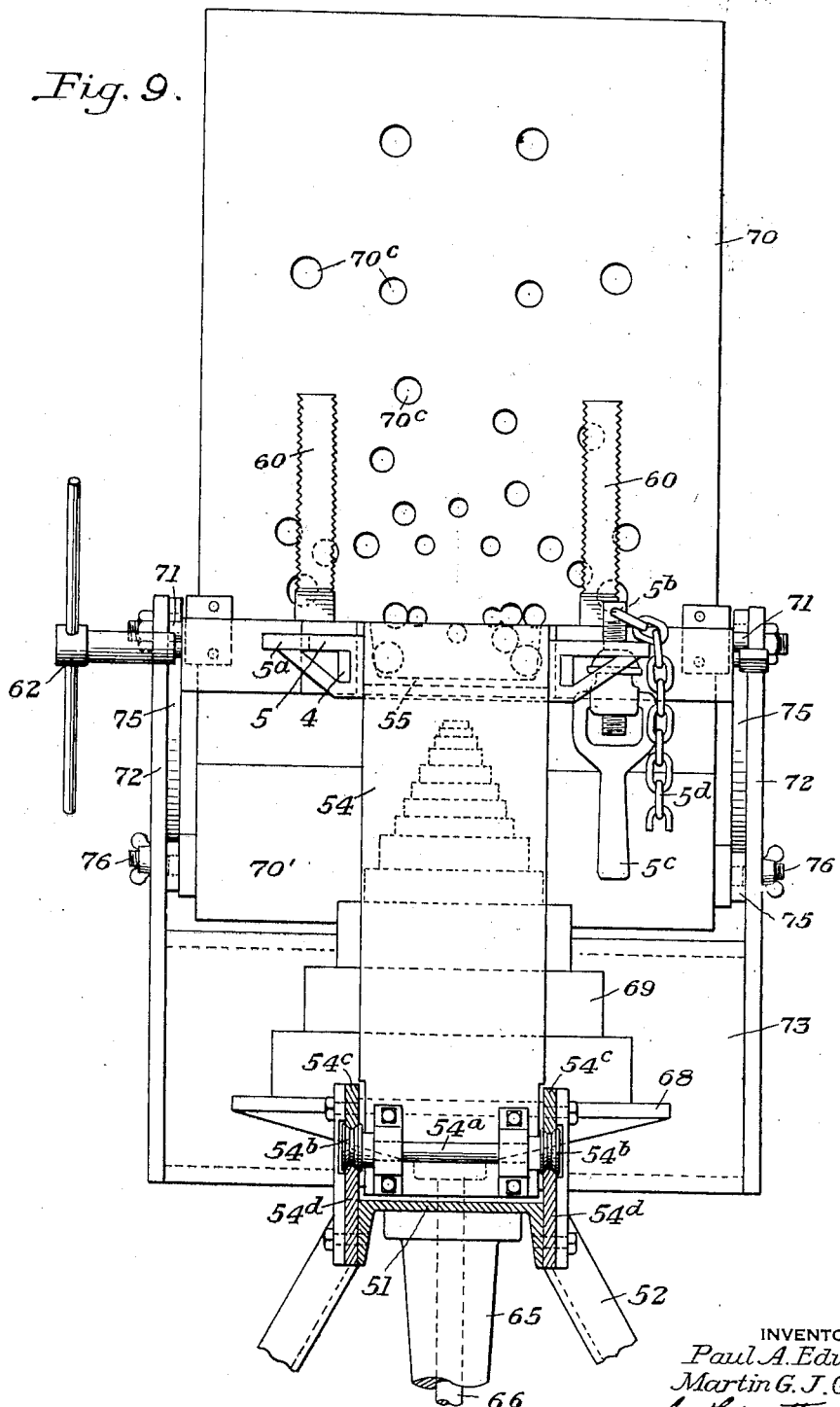

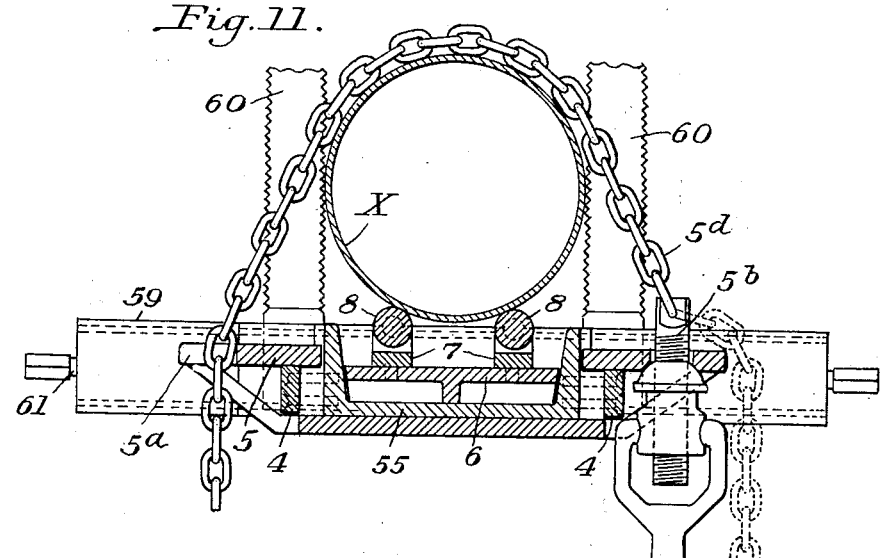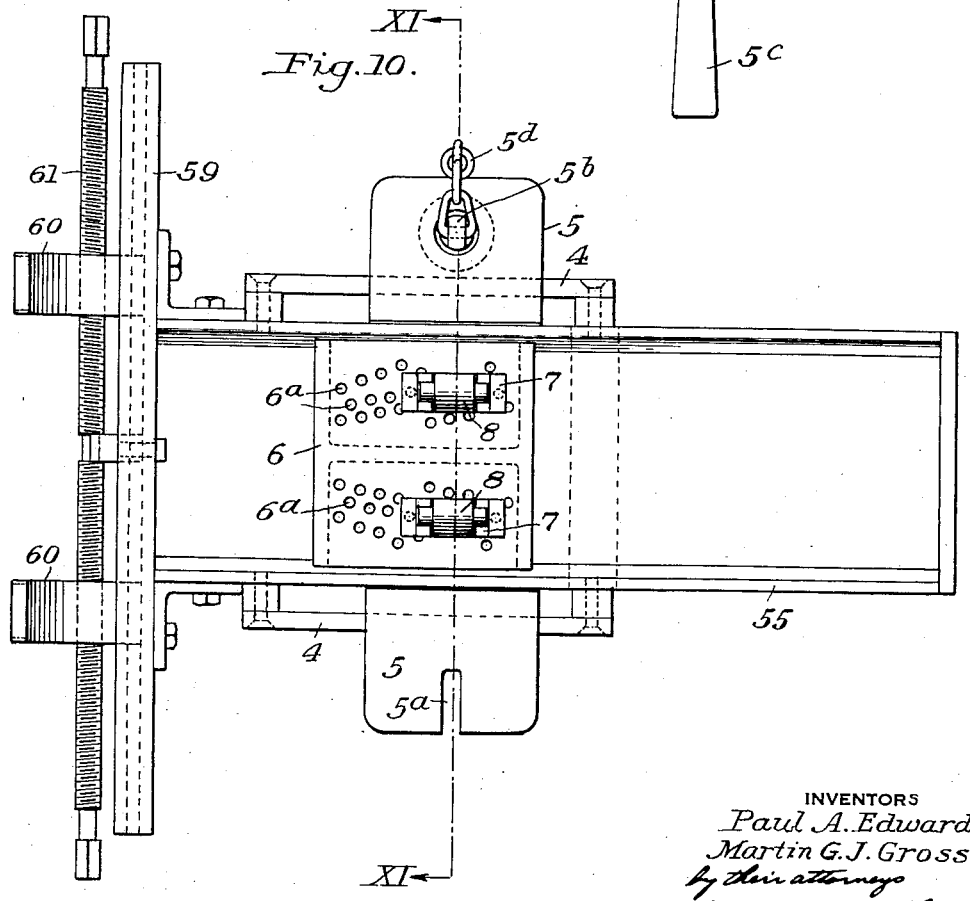

Dec. 14, 1937.　　P. A. EDWARDS ET AL　　2,102,259
PIPE CUTTING AND WELDING BENCH
Filed Oct. 9, 1936　　10 Sheets-Sheet 8

INVENTORS
Paul A. Edwards
Martin G. J. Gross
by their attorneys

Dec. 14, 1937.  P. A. EDWARDS ET AL  2,102,259
PIPE CUTTING AND WELDING BENCH
Filed Oct. 9, 1936   10 Sheets-Sheet 9
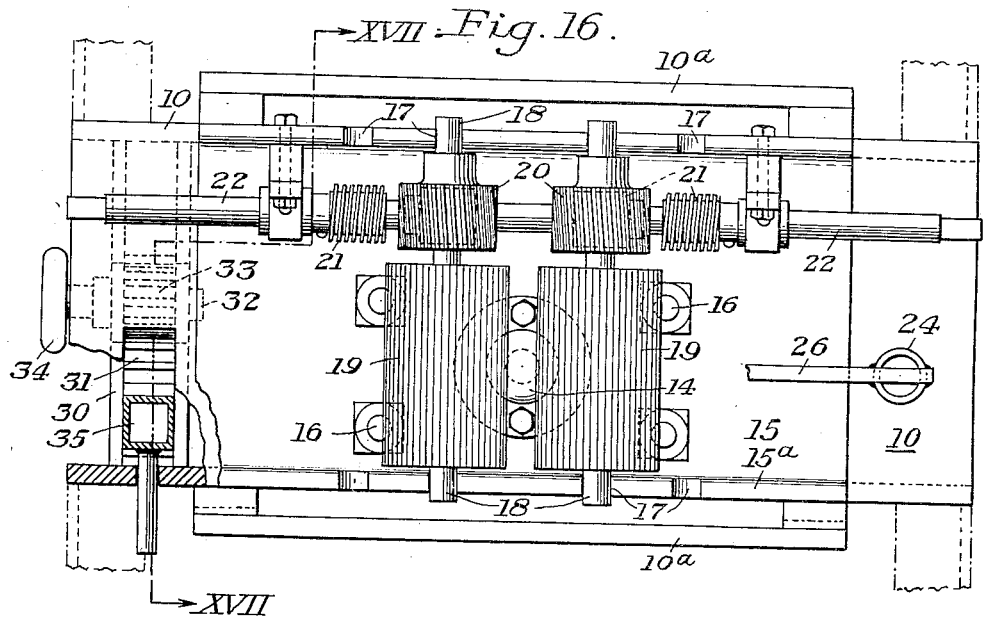
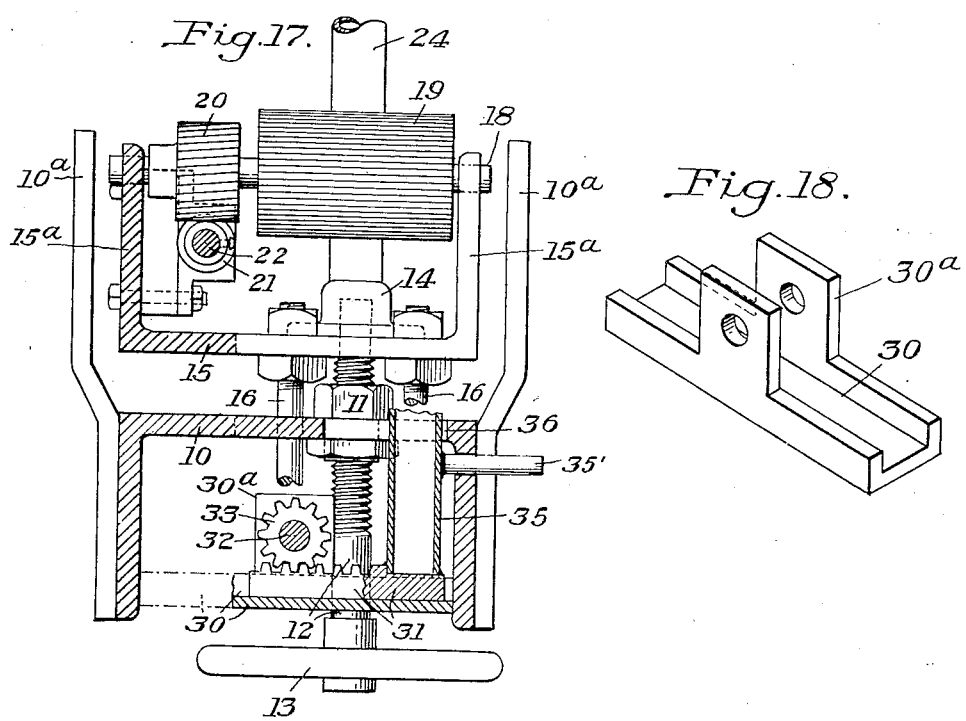
INVENTORS
Paul A. Edwards
Martin G. J. Gross
by their attorneys

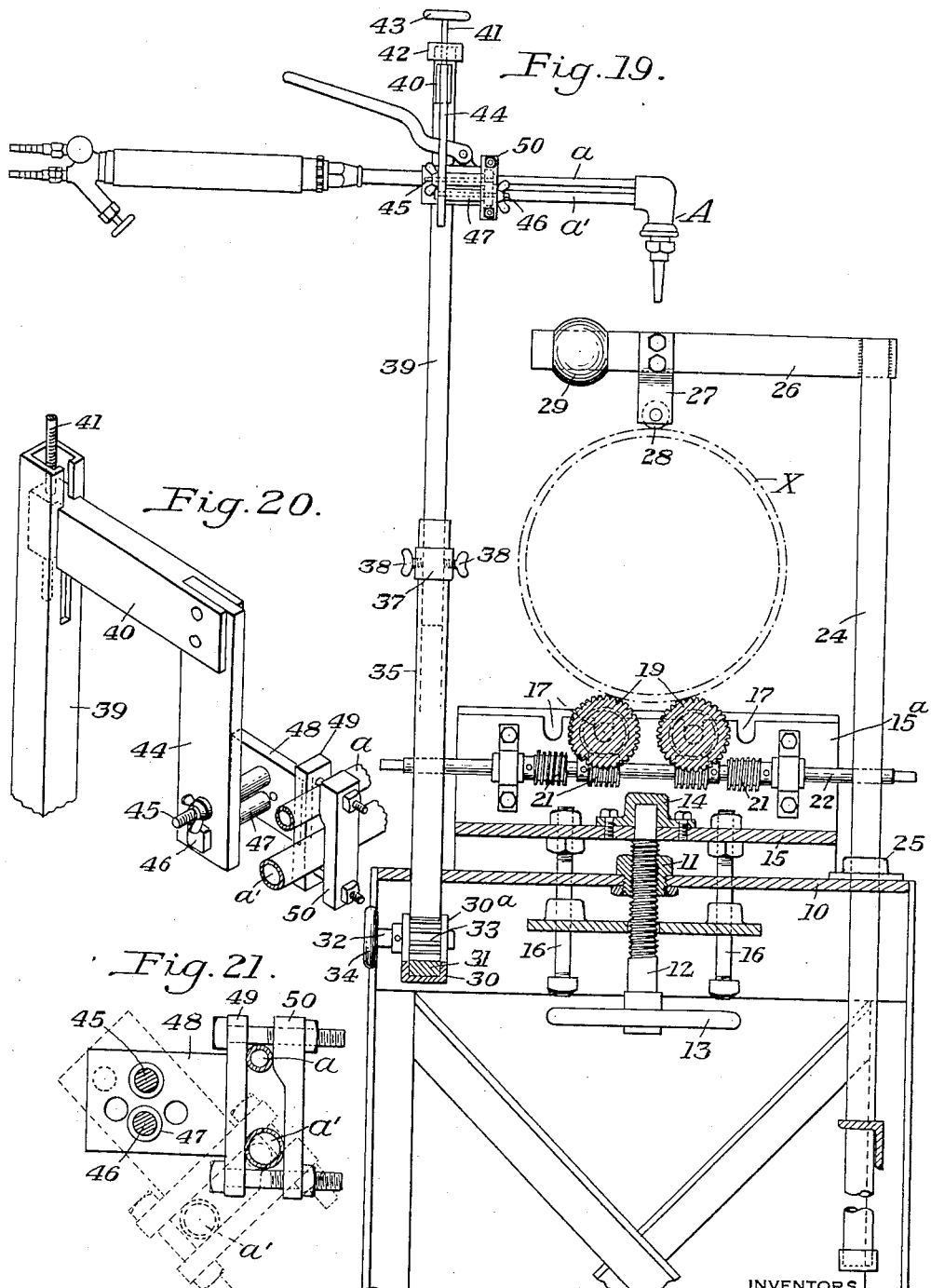

Patented Dec. 14, 1937

2,102,259

UNITED STATES PATENT OFFICE 2,102,259

PIPE CUTTING AND WELDING BENCH

Paul A. Edwards and Martin G. J. Gross, Pittsburgh, Pa., assignors to G. F. Higgins Company, Pittsburgh, Pa., a corporation of Pennsylvania Application October 9, 1936, Serial No. 104,902

23 Claims. (Cl. 29—33)

This invention relates to the preparation of pipe or tubing for welding and to the supporting pipe and pipe connections for the purpose of being welded, and is for a bench equipped to hold the pipe and various pipe connections while they are being prepared for welding or being welded.

Modern piping installations such as heating and refrigerating installations, particularly in large buildings and plants, require the use of welded pipe connections and pipe fittings instead of threaded connections heretofore more generally used. All connections must be accurately welded and must be properly aligned. Some of the various welding operations required are the joining of two straight lengths of pipe, joining a straight length of pipe with an elbow or with a T, or with a flanged coupling. In the welding operation, the abutting ends to be joined are beveled. In making the weld, the two parts, after being properly beveled, are brought into abutting relation and the parts are tacked together by "spotting" metal into the joint at separated intervals. Subsequently the entire trough formed between the two abutting beveled ends of the parts being welded is filled with welding metal. During the preliminary tacking operation the parts must be very accurately positioned and aligned and must be held in this position until they have been tacked. Considerable difficulty is encountered in holding the parts to be joined in proper relation until they are tacked. Difficulty is also encountered in the field in providing a bevel on a straight length of pipe, and the cutting of the pipe to length and the beveling thereof is now frequently done before the pipe is taken into the field.

According to the present invention there is provided a work bench by means of which the making of all of the various connections required can be very greatly facilitated and the parts to be joined held in more accurate alignment. The bench is adapted to handle all sizes of pipes and fittings which are encountered in the field. It is furthermore adapted to the cutting of straight lengths of pipe to form a bevel or chamfered end where it is required.

The bench is of such character that it may be readily transported from place to place so as to adapt it for use in the field. It comprises, in its present preferred form, a stand which carries a main bed member capable of supporting straight lengths of pipe. Located adjacent one end of the bed member is a pipe cutting unit which includes an oxyacetylene torch for performing various operations on a piece of pipe, including the cutting of the pipe with the necessary bevel for welding it. Beyond this there is provided a carriage which also has a supporting bed and which carries a vise at its forward end capable of engaging pipes and pipe fittings of different diameters. There is provided an adjustable support for supporting either elbows or T's, this adjustable support being capable of accommodating all sizes of fittings in the range of pipe diameters for which the bench is intended to be used. In addition to this, means is provided for receiving and holding flanged couplings and for receiving and holding angle connections which are less than 90°. All of the parts are arranged for quick and convenient use, or are so constructed that the various parts and connections to be welded can be quickly and accurately brought into alignment and tacked.

The invention may be readily understood by reference to the accompanying drawings, in which:

Figure 1 is a side elevation of a pipe-working bench embodying the invention;

Figure 2 is a top plan view of the bench shown in Figure 1;

Figure 3 represents a side elevation of the forward or working end of the bench;

Figure 4 is a top plan view of the arrangement shown in Figure 1;

Figure 5 is a detail view on a somewhat larger scale representing a fragmentary section in the plane of line V—V of Figure 4;

Figure 6 is a transverse vertical section in the plane of line VI—VI of Figure 5;

Figure 7 is a view similar to Figure 3 showing the parts adjusted for welding an angle connection to a straight piece of pipe as distinguished from Figure 3, which shows the operation of joining a flanged connection to a straight piece of pipe;

Figure 8 is a view generally similar to Figure 3, but showing on a larger scale a lesser portion of the forward or working end of the machine and showing the manner of using the machine for welding an elbow to a straight piece of pipe;

Figure 9 is a transverse vertical section in the plane of line IX—IX of Figure 3;

Figure 10 is a top plan view of the adjustable support, which support is also shown in section in Figure 11;

Figure 11 is a transverse vertical section in the plane of line XI—XI of Figure 10; a pipe, however, being shown clamped to the support;

Figure 16 is a top plan view of that portion of the machine which is used for cutting the pipe;

Figure 17 is a vertical section in the plane of line XVII—XVII of Figure 16;

Figure 18 is a perspective view of the detailed part of the apparatus shown in Figures 16 and 17;

Figure 19 represents a transverse section to a somewhat larger scale in substantially the plane of line XIX—XIX of Figure 3;

Figure 20 is a perspective view showing a portion of the cutting torch holding an adjusting mechanism; and Figure 21 is a detail view of the clamp for holding the cutting torch.

Figure 12:
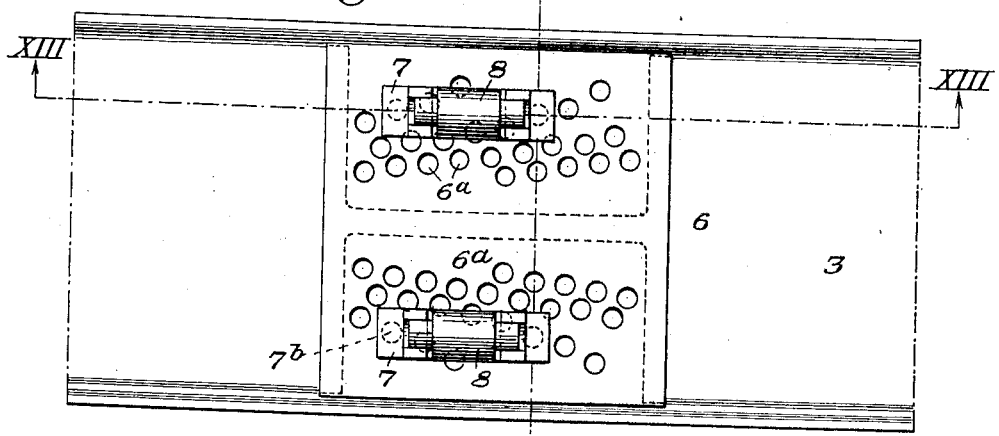
Figure 12 is a detail view of the pipe-supporting blocks and rollers used on the auxiliary support and on the main bed of the machine.

Referring to the drawings, there is provided a structural frame 2 which supports the main bed member 3 of the bench. This bed member is preferably formed of a length of structural channel with the flanges of the channel turned upwardly so that the top of the bench is in effect a trough. There are preferably provided at intervals along the bench pipe clamps adjustable for engaging pipes of a wide range of diameter. These clamps are preferably of the chain type and they may be adjustable to a limited extent longitudinally of the bed of the machine. The clamps comprise a supporting bar 4 at opposite sides of the outside of the bed member 3. The members 4 carry brackets 5. One of the brackets is provided with a notch 5a in its outer edge while the opposite bracket is provided with an adjusting screw 5b having a swiveled operating handle 5c. One end of a chain 5d is attached to the screw. The other end of the chain may have one of its links caught in the notch 5a of the opposite bracket. In the operation of the pipe clamps, the chain is thrown over a pipe which is placed on the bed of the machine, one of the links of the chain caught in the notch 5a, and the screw 5b is then turned to tighten up on the chain.

Figure 13:
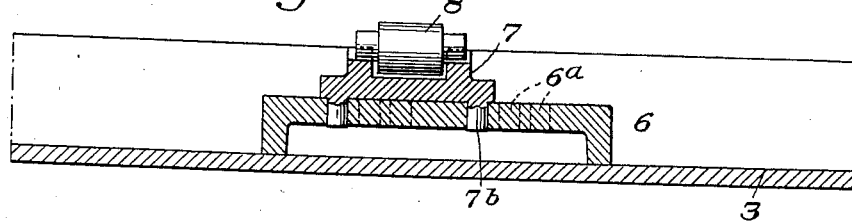
Figure 13 is a section in the plane of line XIII—XIII of Figure 12.
Figure 14:
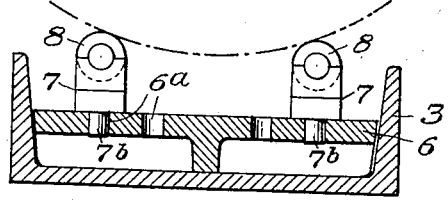
Figure 14 is a transverse section in the plane of line XIV—XIV of Figure 12.
Figure 15:
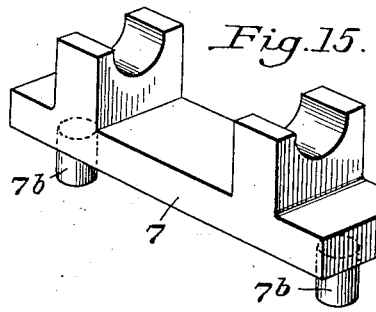
Figure 15 is a detail perspective view of one of the roller supporting blocks.

For supporting the pipes in such manner that they may be readily turned while they are on the bed of the machine and at the same time for supporting pipes of different diameters in such manner that the bottom of the pipe irrespective of its diameter will always be at the same level, there are provided in the trough of the bed member 3 supporting blocks having rollers thereon, the rollers being so spaced for a given diameter of pipe that the bottom of the pipe will always be at a proper level to suit the other parts of the machine hereinafter described. In order to avoid the use of different blocks having differently spaced rollers for different diameters of pipe we preferably employ supporting blocks of the character shown in detail in Figures 10 to 15, inclusive. Each of these pipe supporting blocks of which there may be two or more, comprises a base member 6 of a dimension to fit snugly in the bed provided on its under face with suitable strengthening ribs and having therein at opposite sides of the longitudinal center line thereof, two sets of openings 6a. The openings of each set are arranged in two groups and each pair of openings is spaced a different distance from the center line of the block. The longitudinal distance between each pair of openings is, however, always the same. These openings are so positioned that the two pins 7b on roller supporting members 7 may be entered in any pair of holes. Each roller supporting member 7, of which there are two on each block, carries a pipe engaging roller 8. When pipes of small diameters are to be operated upon, the roller supporting members 7 are set in that pair of holes nearest the center line of the block. As pipes of larger diameters are worked upon, the blocks are moved outwardly from the center. Since the pipes are always of different standard sizes, the holes in each group at each side of the center block are positioned with reference to these standard sizes of pipe. By reason of this arrangement, the lowermost portion of the pipe irrespective of its diameter, will always be at the same height above the bed of the machine. Figure 11 shows the manner in which a pipe is supported on the rollers and also shows the manner of clamping a pipe.

Secured to one end of the supporting frame 2 of the machine, which end will hereinafter be referred to as the forward end of the main bench, there is a fixed supporting member 10 having a nut 11 mounted therein. Passing through the nut 11 is a threaded adjusting post 12 having a hand wheel 13 at the lower end thereof. The top of the post 12 is entered in a socket 14 on a vertically adjustable plate 15. The plate 15 is also provided with guide rods 16 which pass through the plate 10. The arrangement is such that by turning the hand wheel 13 in one direction or another, the supporting plate 15 may be raised or lowered with reference to the main bed of the machine.

The plate 15 is conveniently formed of a piece of channel iron having its flanges turned upwardly and which is set crosswise with respect to the length of the bed 3 of the machine. The upwardly turned flanges 15a of the plate 15 are notched as indicated at 17 to receive the trunnions 18 at opposite ends of knurled rollers 19. There are shown two sets of notches at each side of the center line of the machine, the purpose being that in working on pipes of small diameters the knurled rollers 19 will be set close together as shown in Figure 16, but can be set far apart in the outermost notches in operating on pipes of large diameter. Each of the knurled rollers 19 is provided with a worm gear 20. The worm gears 20 mesh with worms 21 on a cross shaft 22. There are two sets of worms 21 for each roller, one to engage the respective worm wheels when the roller which it operates is in the innermost notch, the other being for the purpose of driving the roller when the roller is in its outermost position. The shaft 22 is manually turned by means of a crank or wrench which may be attached to either end of it and which is designated 23 in Figure 3.

The purpose of the rollers 19 and the cooperating drive is for turning a pipe which is engaged on the bed of the machine when a pipe is to be cut, and particularly when a chamfered or beveled end is to be cut on the pipe at the point of separation. Normally the plate 15 is in a position where the rollers 19 are below the level of any pipe which is set on the bed of the machine. When a cutting operation is to be performed, however, the plate 15 is elevated by turning the hand wheel 13 until the knurled rollers 19 engage under the overhanging end of a pipe which has been placed on the bench, the platform 15 being elevated to a point where the weight of the forward end of the pipe will be taken on these rollers. By turning the crank 23 with the mechanism thus elevated, the pipe can be rotated slowly by reason of the friction between the knurled rollers 19 and the pipe which is resting thereon. This may be seen from Figure 19. For increasing the frictional engagement between the pipe and the rollers, there may be provided a floating weight to bear against the pipe at a point approximately above the rollers 19. This floating weight is best shown in Figure 19. It comprises a post 24 pivotally and slidably passing through a guide 25 on the supporting member 10, permitting the post to move up and down and also be turned about its vertical axis. At the top of the post is a laterally projecting arm 26 carrying a downwardly projecting arm 27 having a roller 28 therein adapted to ride on the surface of a pipe. The arm 26 also carries a weight 29. In Figure 19 a pipe is indicated at X. It will be seen that the roller 28 exerts downward pressure on the pipe X by reason of this floating weight arrangement. When the pipe is of smaller diameter than that illustrated, the weight, of course, will drop down and if the pipe is of larger diameter the weight may be raised. When it is not desired to use the weight, the post 24 can be rotated about its axis to a point where the arm 26 and the weight carried thereby clears the pipe and the weight allowed to drop down to a position where it is out of the way.

The cutting of the pipe is effected by means of an oxyacetylene torch, and the present invention contemplates a torch supported to operate on the pipe when the pipe is being turned in the manner just described. For supporting and operating a torch during the cutting of a piece of pipe, there is provided on the fixed supporting member 10 (see Figures 17, 18, and 19) a fixed channel-like member 30 shown in detail in Figure 18, which is welded to the downwardly turned flanges of the supporting member 10. Received in the trough of this channel member is a horizontal rack 31. An operating shaft 32 passes through lugs 30a on the member 30. This shaft is provided with a pinion 33 which engages the rack 31. The shaft 32 is provided on its outer end with a hand wheel 34. By turning the hand wheel 34, the rack 31 may be shifted back and forth in the direction of the longitudinal axis of the pipe. Secured to one end of the rack 31 is a hollow post 35 which passes upwardly through a slot 36 in the supporting member 10, and which is provided at its upper end with a collar 37 having set screws 38 therein. A guide pin 35' on the post 35 is provided to give the post rigidity against sway. Telescopically received in the hollow post 35 is a second post member 39. The post member 35 and the post member 39 which telescopes into it are both preferably square in cross section, as shown in Figure 20. The upper member of the post member 39 is slotted in a vertical direction as shown in Figure 20, to receive the specially shaped end of a laterally projecting arm at 40. Threaded through the inner part of the arm 40 is a screw 41 which extends above the top of the post 39 and which passes through a guide cap 42 at the top of the member 39. At the upper end of the screw 41 is a hand wheel 43. The arm 40 is adapted to carry a torch by reason of a clamp carried thereby, which clamp will be hereinafter described. Major vertical adjustment of the torch is provided by the telescoping connection and the set screws 38. Close fine adjustment of the torch in a vertical direction is provided by the screw 41 and its hand wheel 43.

Carried on the arm 40 is a downwardly projecting extension 44 carrying two oppositely directed bolts 45 and 46 at its lower end. These bolts pass through spacing sleeves 47 and support a bracket 48 having a jaw 49 thereon. A clamping jaw 50 cooperates with the jaw 49 (see Figures 20 and 21) for clamping the tubes of a cutting torch therebetween, this cutting torch being designated generally as A and the tubes being designated a and a'. The bracket 48 has four holes therein, as shown in Figure 21, and by leaving the bolt 45 in place and moving the bolt 46 into any one of the other three holes the torch can be held at different angles with respect to the pipe. This adjustment permits it to be inclined toward the main bench 3 or in a direction away from the main bench, or to be pointed directly downwardly.

In the operation of using the torch, it is adjusted at a vertical height to direct a flame against the pipe X. It is inclined in the direction of the cut to be made, where the tube is to be cut with a chamfered end rather than with a straight cut. As the torch plays against the pipe it is moved back and forth to a very limited extent by the operator turning the hand wheel 34 to operate the rack and pinion drive hereinbefore described, allowing the flame to impinge against the pipe at a point in advance of the point where the pipe is to be cut, and then brought back to the line at which the severing is to take place. As the torch is thus operated, the operator turns the hand crank to rotate the pipe, enabling it to be thereby quickly and easily cut off. It will, of course, be understood that during the time that the pipe is being rotated none of the pipe clamps hereinbefore described are in use.

After the cutting of the pipe has been completed, the cutting mechanism, at least that portion comprising the knurled rollers and the associated parts, can be dropped down so as to be clear of a pipe projecting beyond the end of the main bed of the machine. It will be noted that rigid cross plates 10a are provided on the member 10. The top edges of these plates 10a are in a plane corresponding to the bottom of a pipe mounted on the bed, so as to serve as a support for the pipe when the knurled rollers are lowered and also provide a protecting guard for the knurled rollers and their associated parts.

We shall next describe that portion of the machine which is used primarily in the welding of connections of various types to the end of a piece of pipe supported on the bench. Extending from the forward end of the support 2 and in a plane considerably below the plane of the bed 3, there is an auxiliary bed member 51 with uprights 52 and 53 near its outer end for supporting it on the floor. The auxiliary bed or forward extension 51 is conveniently made from a piece of channel iron inverted so that the flanges thereof project downwardly. Mounted for movement along the member 51 is a stand 54. We have shown this stand as being in the form of a plate (see Figures 3 and 9) with a pair of cross shafts on opposite sides thereof, these cross shafts being designated 54a. The shafts are provided with flanged guide rollers 54b engaging between upper and lower track members 54c and 54d, respectively, there being a pair of these track members at each side of the bed 51. This arrangement of mounting the upright support 54 enables it to be moved back and forth along the member 51 while the upper rails 54c of the trackway prevent the support 54 from tilting. Carried on the upright support 54 is a supporting bed 55 formed from channel iron, corresponding to the main bed member 3, and which is at a level corresponding directly to the level of the main bed member 3. It is provided with a pipe clamp of the character hereinbefore described and the same reference numerals have been used to designate the various parts of this pipe clamp as have heretofore been used to describe those pipe clamps along the main bed of the machine. There is also removably received in this short trough member a pipe supporting roll block unit 6 of the character hereinbefore described and as shown in Figures 10 to 15, inclusive. At the front end of the member 55 is a cross piece 59 having a T slot therein for the accommodation of two forwardly offset jaw members 60. These jaw members have oppositely threaded openings therethrough to accommodate the oppositely threaded portions of a jaw-operating screw 61. This screw can be turned by means of a wrench or crank 62 and by turning the shaft 61 the jaws may be made to move toward or away from each other. The jaws as shown in Figures 8 and 9 are straight-sided with the edges thereof serrated. The object of making both the inner and the outer faces of the jaws serrated is to make them interchangeable from the left to the right hand side of the vise or clamp so that after the serrations have worn from one side the jaws may be reversed, presenting fresh serrations. These jaws may be variously used in the operation of welding, as will be hereinafter more fully described.

Secured to the longitudinally extending supporting member 51 is a depending bushing 65 through which passes a shaft 66 having a threaded lower end. Carried at the lower end of the guide or bushing 65 is a nut 67 comprising a hand wheel which can be turned to move the shaft 66 up or down. At the top of the post or shaft 66 is a table 68. Carried on the table 68 is a stepped cone 69. The number of steps on the cone corresponds to the number of different sizes of pipes with which the bench is adapted to be used. The diameter of the steps corresponds to the various diameters of pipes in the range of pipes in connection with which the bench is adapted to be used, while the height of the cone and the individual steps of the cone are proportioned according to the elbows used for pipes in this range of sizes. The purpose of the cone 69 is to provide a support on which an elbow to be joined to an end of a piece of straight pipe may be set in the manner shown in Figure 8, wherein one size of elbow is designated X' and the pipe itself is designated X. The different diameter steps accommodate elbows of different diameters according to the size of pipe which is being operated upon. Since the elbows are formed with square ends and since the steps on the tapered cone 69 are square, any elbow placed on one of these steps will have the unsupported end thereof truly vertical. Therefore, when the pipe X which is supported in a truly horizontal position is brought into position against the end of the coupling X', the ends of the two parts to be joined will abut in such manner that when they are welded there will be no misalignment between the pipe and its connection.

When operations are being performed on the bench other than the welding of elbows, the cone 69 can be dropped down by operation of the hand wheel 67 to a point where it does not interfere with other operations to be performed. When it is desired to use the tapered cone 69, however, for the welding of elbows, it is raised to the position shown in Figure 8. In making a weld the straight piece of pipe is laid on the bed 3 of the main body of the bench with the forward end thereof projecting beyond the end of the bed. At this time, the cutting unit heretofore described is lowered to a position where it does not interfere with the pipe. An elbow of the size to be used is set on the proper step of the cone 69. The movable support comprising the upright 54 and the auxiliary trough 55, is then moved along the member 51 to a point where the clamping jaws 60 may embrace the elbow X' as shown in Figure 8. The vise jaws are then operated to clamp the elbow, thereby turning the elbow about a vertical axis to bring it into alignment with the pipe to which it is to be welded. The straight length of pipe, heretofore designated X, is then slid forward so that its overhanging end will be supported on the carriage 54—55, the rollers 8 of the roller block 6 mounted in this member being set a proper distance to support a pipe of the diameter of the pipe X. With the pipe X in this position and so supported, it is worked forward until the chamfered end thereof abuts against the vertical edge of the elbow X'. If desired, the pipe clamps may be then operated to clamp the pipe in this position, although in all cases it is not necessary to clamp the pipe as the parts so supported will remain in this abutting relation. The welder then flows metal into the joint at different places to tack or secure the elbow to the end of the pipe. After the elbow has been tacked to the end of the pipe in the proper position, the pipe with the attached elbow can be lifted clear of the machine and the weld rapidly completed. The apparatus, however, holds and supports the pipe and the elbow before the welding takes place, in such manner that there can be no misalignment.

The tapered cone 69 has its primary utility for securing elbow connections, or T connections, to the straight length of pipe. Where a flanged coupling is to be secured to a straight piece of pipe or where a curved section less than a 90° elbow is to be welded, the cone 69 is not employed but is lowered out of position and other supporting means is used. This other supporting means comprises a flat plate 70 having opposed lateral trunnions 71 thereon received in notches of opposed uprights 72 secured to a cross piece 73 mounted on the supporting frame, as best shown in Figures 5, 6, 7, 8, and 9. This plate has a depending counterweighted portion 70', so that when the plate swings free on its trunnions, it tends to assume a vertical position. As viewed in Figure 7, it can swing from a vertical position in an anti-clockwise direction to a horizontal position, but it is prevented from swinging in a clockwise direction from the vertical position by reason of a fixed stop 74 comprising a bar or strip extending across between the uprights 72. Attached to the sides of the counterweighted portion 70' are slotted guide members 75. Clamping bolts with wing nuts 76 carried on uprights 72 enable the plate 70 to be clamped in a vertical position against pivoting or tilting movement or to be clamped in various angular positions between the vertical and horizontal as may be needed.

At the outermost or forwardmost end of the bench structure, the uprights 53 converge to support a short channel member 77, which channel member has the flanges thereof turned upwardly, and the width and depth of this channel member correspond to the width and depth of the main bed of the machine 3 and to the channel member 55 comprising the adjustable support. A roll block unit as described in Figures 12 to 15 may be placed in this support 77. Projecting outwardly from the inner end of the member 77 is a bifurcated lug 77' so positioned that when the plate 70 is swung down to a horizontal position, its top or outermost end will rest against the lug 77'. A pivoted clamping screw 70a on the back of the plate 70 will at this time engage in the bifurcation of the lug 77', and by reason of this arrangement the plate 70 can be clamped in a horizontal position, as shown by the dotted lines in Figure 3 to provide a flat working surface. There may be provided a horizontal lug or extension at 77a to which may be secured another bench section not shown.

It is possible by the arrangement described to have the plate 70 in a truly vertical position or in a truly horizontal position, or to have it at an incline between these two planes.

Formed in the plate 70 in predetermined relation to its trunnion 71 are a number of holes, the holes being marked 70c. These holes are arranged in groups, all the holes of one group being a given distance from the center, each group of holes being on a different radius struck from a different circle. Flanged pipe connections which are used for making flanged joints and welded pipes are provided in a standard range of sizes according to the different diameters of pipe, and they are drilled with bolt holes located the same distance apart in all flanges of the same size. The holes 70c in the plate 70 are so positioned and are of such diameter that any standard flanged coupling can be temporarily bolted to the plate 70, as shown in Figure 3, by at least two bolts. Moreover, the relation of the holes is such that when any size of flanged coupling is so secured to the plate, the coupling will exactly align with a corresponding diameter of pipe supported on the main bed 3 and the auxiliary supporting bed 55 if the rollers 8 in the roller blocks 6 for supporting the straight length of pipe, have been properly set. In other words, the holes 70c are so located with respect to the trunnions that when a flanged coupling of any diameter is secured to the plate by bolts passing through the proper holes, the bottom of the coupling will be in line with the bottom of a pipe supported on the bench, and since the pipe and the coupling are of the same diameter the pipe and the coupling will properly align. Since the end of the pipe is square and the end of the coupling is square and the plate 70 is in a truly vertical plane, it is an easy matter to quickly secure the coupling to the plate 70 and to bring the end of the pipe X up against the coupling and to tack the pipe and coupling together while they are held in this abutting relation.

In Figure 3, the flanged coupling is designated $X^2$. In operating the mechanism to weld a flanged coupling to a straight length of pipe, the stepped cone 69 is dropped down to a position where it does not interfere with the movement of the adjustable support 54—55. The adjustable support 54—55 is then moved forward so that the clamping jaws 60 may engage the straight length of pipe X at a point near the forwardmost end thereof. The adjustable support is useful not only for supporting the pipe against sagging where it projects beyond the main supporting bed, but is also useful in supporting short lengths of straight pipe which are of insufficient length to be supported on the main bed 3 when in position to be welded.

When an angle connection is to be welded to the pipe in lieu of a coupling, the table 70 is tilted to a position corresponding to the angle of the coupling. This is illustrated in Figure 7, where the coupling designated $X^3$ is a 45° angle. The plate 70 is moved to a clamp at a 45° angle. The adjustable support 54—55 is then moved forward to the position shown where it projects over the cone 69. The pipe X is then moved forwardly to approximately the position it will need to be in for welding, and the angular coupling $X^3$ is set on the plate 70. It is slid down the plate 70 until its vertical edge contacts the end of the pipe X. The vise jaws 60 may then be operated to engage and clamp the angular connection, and with the parts thus held, the temporary welding or tacking is performed. Should the weight on the overhanging portion of the carriage 54—55 be at any time excessive, the cone 69 may be raised until it engages the bottom of the member 55 to provide an additional rigid support for the overhanging end of the member 55.

Where a long piece of pipe is to be cut at a point between its ends, the cone 69 is dropped down to the inoperative position and the table 70 is swung to the horizontal position shown in dotted lines in Figure 3. In this position it does not interfere with the pipe being properly located on the work bench for the cutting operation to be performed at the point desired. Where two short straight lengths of pipe may for any reason have to be welded, the plate 70 may be swung down to a horizontal position and one section of the pipe mounted on the member 77 and the other section on the member 55. Various other miscellaneous operations can be performed with the plate 70 in the horizontal position.

Since the bench is of such a character that the principal portion thereof is built from standard structural shapes, it provides a relatively inexpensive work bench on which all of the various operations necessary for welding pipes in the field can be quickly and accurately performed, and provides in addition an economical means for the cutting of pipe with a chamfered end, where such cutting has to be done in the field. For example, a piece of pipe may be laid on the main bed of the machine, cut to the proper length with a chamfered end, the end so formed then being moved forward and an elbow or angle connection quickly attached. The pipe may then be reversed end for end and a flanged coupling quickly and accurately secured to the opposite end. Where any operation is performed, it can be performed with assurance that the parts are maintained in proper alignment. Heretofore, only flat tables have been available for use in the field, and the welder has had considerable difficulty in holding the various parts in position for the preliminary weld. The welder had to place miscellaneous pieces of metal in and around the parts to be welded to hold them in position and had only to use his judgment as to whether the parts were properly aligned.

The present invention enables the welder to bring parts together and hold them in proper position for the various operations that have to be performed in the field, and in a considerably shorter time and with a greater degree of accuracy than has been heretofore possible.

While we have shown and described one particular embodiment of our invention, it will be understood that various changes and modifications may be made in the construction and arrangement of parts within the contemplation of the invention and under the scope of the appended claims.

We claim:

1. A work bench of the class described, comprising a supporting structure having a main bench portion having means to receive and support a length of straight pipe, supporting means for holding fittings of different diameters located adjacent to but beyond one end of the bench having means thereon for engaging and holding fittings over a range of sizes in position to be welded to such straight length of pipe, and means for effecting relative vertical movement between the supporting means on the bench and the supporting means for the fittings to maintain the pipe and the fittings in horizontal alignment whereby the bench can be used with pipes and fittings over a range of diameters.

2. A pipe working apparatus for use in assembling welded pipe installations, comprising a main work bench having a bed, a pipe support spaced from one end of the main work bench, and an adjustable support between the main work bench and said first mentioned support.

3. A pipe working apparatus for use in assembling welded pipe installations, comprising a main work bench, a support spaced from one end of the main work bench, an adjustable support between the main work bench and said first mentioned support, said movable support being provided with a pipe clamping vise thereon, and coupling supporting means located adjacent said adjustable support.

4. A pipe working apparatus for use in assembling welded pipe installations, comprising a main work bench, a support spaced from one end of the main work bench, an adjustable support between the main work bench and said first mentioned support, said movable support being provided with a pipe clamping vise thereon, and coupling supporting means located adjacent said adjustable support, said vise having forwardly offset jaws for engaging a coupling so supported on the coupling supporting means.

5. A work bench for use in constructing welded pipe installations, comprising a main bench structure having a bed for supporting a length of pipe to be operated upon, and means adjacent to but spaced away from one end of the bed for supporting and holding fittings in alignment with the length of pipe on the bed and in such manner that the length of pipe may be brought into abutting relation with the end of a fitting so supported and the fitting held against movement until it is welded to the pipe.

6. A work bench for use in constructing welded pipe installations, comprising a main bench structure having a bed for supporting a length of pipe to be operated upon, and means adjacent one end of the bed for supporting and holding fittings in alignment with the length of pipe on the bed and in such manner that the length of pipe may be brought into abutting relation with the end of a fitting so supported and the fitting held against movement until it is welded to the pipe, said supporting means being adapted to hold fittings for pipes of various diameters, said bed being provided with means for supporting pipes of various diameters.

7. A work bench for use in constructing welded pipe installations comprising a main bench structure having a bed for supporting a length of pipe to be operated upon, and means adjacent one end of the bed for supporting and holding fittings in alignment with a length of pipe so supported on the bed, said supporting means comprising a stepped cone, the steps of which have a diameter corresponding to the internal diameters of the pipe fittings over the range for which the apparatus is adapted to be used.

8. A work bench for use in constructing welded pipe installations comprising a main bench structure having a bed for supporting a length of pipe to be operated upon, and means adjacent one end of the bed for supporting and holding fittings in alignment with a length of pipe so supported on the bed, said supporting means comprising a stepped cone, the steps of which have a diameter corresponding to the internal diameters of the pipe fittings over the range for which the apparatus is adapted to be used, and means for adjusting said stepped cone vertically with respect to the bed.

9. A work bench for use in constructing welded pipe installations, comprising a main bench structure having a bed for supporting a length of pipe to be operated upon, means adjacent one end of the bed for supporting and holding fittings in alignment with a length of pipe so supported on the bed, and an auxiliary longitudinally adjustable support between said means and the bed.

10. A work bench for use in constructing welded pipe installations, comprising a main bench structure having a bed for supporting a length of pipe to be operated upon, means adjacent one end of the bed for supporting and holding fittings in alignment with a length of pipe so supported on the bed, and an auxiliary longitudinally adjustable support between said means and the bed, said adjustable support having adjustable jaws thereon.

11. A work bench for use in constructing welded pipe installations, comprising a main bench structure having a bed for supporting a length of pipe to be operated upon, a plate in fixed relation to but spaced away from the bed and positioned transversely of the bed, said plate being so disposed that flanged pipe fittings may be secured thereto with the flanges thereof engaged against the plate whereby the end of the pipe on the bed can be brought into abutting relation to the flanged fitting.

12. A work bench for use in constructing welded pipe installations, comprising a main bench structure having a bed for supporting a length of pipe to be operated upon, a perpendicular plate spaced away from the end of the bed and positioned to intersect the projecting axis of a length of pipe on the bed, said plate having means for holding flanged pipe fittings thereon with the flange thereof against the plate whereby a pipe on the bed and a fitting on the plate may be brought and held into abutting alignment, said means for holding the fittings being movable to various positions to accommodate varying diameters of fittings, and means whereby pipes of different diameters may be properly aligned therewith with fittings of corresponding diameter.

13. A work bench for use in constructing welded pipe installations, comprising a main bench structure having means for supporting a length of pipe to be operated upon, means adjacent one end of the bench for supporting and holding fittings in alignment with a length of pipe so supported on the bed, said means comprising a pivotally supported plate member movable from vertical position where it is located transversely across the axis of a pipe on the bench to a horizontal position where it is below the plane of a pipe so supported on the bench.

14. A work bench for use in constructing welded pipe installations, comprising a main bench structure having means for supporting a length of pipe to be operated upon, means adjacent one end of the bench for supporting and holding fittings in alignment with a length of pipe so supported on the bed, said means comprising a pivotally supported plate member movable from vertical position where it is located transversely across the axis of a pipe on the bench to a horizontal position where it is below the plane of a pipe so supported on the bench, and means for holding the plate in either the vertical or horizontal position or for holding it at an intermediate angle.

15. A work bench for use in constructing welded pipe installations, comprising a main bench structure having a bed, a plate positioned adjacent one end of the bed, said plate having a plurality of holes therein, the holes being arranged in sets so positioned that any flanged coupling within a range of sizes can be temporarily bolted to the plate in predetermined relation to the bed, and means on said bed for accommodating pipes of different diameters in such manner as to maintain any pipe of any diameter within a given range in proper relation to and in alignment with a flanged coupling of a corresponding diameter secured to said plate whereby the flanged coupling and pipe may be supported in aligned abutting relation to be welded.

16. A work bench for use in constructing welded pipe installations, comprising a main bench structure having a bed, a plate positioned adjacent one end of the bed, said plate having a plurality of holes therein, the holes being arranged in sets so positioned that any flanged coupling within a range of sizes can be temporarily bolted to the plate in predetermined relation to the bed, means on said bed for accommodating pipes of different diameters in such manner as to maintain any pipe of any diameter within a given range in proper relation to and in alignment with a flanged coupling of a corresponding diameter secured to said plate whereby the flanged coupling and pipe may be supported in aligned abutting relation to be welded, and an auxiliary supporting member between the end of the bed and said plate to support short lengths of pipe and also to support the portion of a long pipe which overhangs the bed against sagging when it is in abutting relation with a coupling on the plate.

17. A work bench for use in constructing welded pipe installations, comprising a main bench structure having a bed, a plate positioned adjacent one end of the bed, said plate having a plurality of holes therein, the holes being arranged in sets so positioned that any flanged coupling within a range of sizes can be temporarily bolted to the plate in predetermined relation to the bed, means on said bed for accommodating pipes of different diameters in such manner as to maintain any pipe of any diameter within a given range in proper relation to and in alignment with a flanged coupling of a corresponding diameter secured to said plate whereby the flanged coupling and pipe may be supported in aligned abutting relation to be welded, an auxiliary supporting member between the end of the bed and said plate to support short lengths of pipe and also to support the portion of a long pipe which overhangs the bed against sagging when it is in abutting relation with a coupling on the plate, and a fixed support in line with the bed on the opposite side of the plate, said plate being movable to a horizontal position where it may be supported by the fixed support and provide a flat working surface.

18. A work bench for performing operations upon pipe to be assembled into a piping installation, comprising a main bench structure for supporting a length of pipe thereon, means for rotating a pipe so supported, means for cutting the pipe with a chamfered end while it is being so rotated, and means adjacent one end of the bench for supporting a fitting in a position to be engaged by a pipe supported on the bench and aligned therewith to enable a weld to be effected between the chamfered end of the pipe so supported and the fitting.

19. A work bench for performing operations on pipe to be assembled into a piping installation, comprising a main bench structure for supporting a length of straight pipe thereon, means for rotating a pipe so supported, and torch supporting means having a torch thereon adapted to project a cutting flame against a pipe so supported while it is being rotated.

20. A work bench for performing operations on pipe to be assembled into a piping installation, comprising a main bench structure for supporting a length of straight pipe thereon, means for rotating a pipe so supported, and torch supporting means having a torch thereon adapted to project a cutting flame against a pipe so supported, said torch supporting means being vertically adjustable to adapt the torch for operation against pipes of different diameters.

21. A work bench for performing operations on pipe to be assembled into a piping installation, comprising a main bench structure for supporting a length of straight pipe thereon, means for rotating a pipe so supported, and torch supporting means having a torch thereon adapted to project a cutting flame against a pipe so supported, said torch supporting means being vertically adjustable to adapt the torch for operation against pipes of different diameters, and means for effecting movement of the torch back and forth longitudinally of the pipe while the torch is operating.

22. A combination cutting and welding bench for operating upon pipe, comprising a supporting structure having a main bed thereon, a pipe turning mechanism located adjacent one end of the bed, a cutting torch associated with the pipe turning mechanism, an extension at the forward end of said structure, means on said extension for supporting a range of elbow and T fittings in position to be welded against a pipe supported on the bed of the machine, and other means for supporting flanged and angle fittings in position to be welded against a pipe so supported.

23. A pipe working apparatus for use in assembling welded pipe installations, comprising a main work bench for supporting pipe to be operated upon, supporting means on the bench for holding and supporting pipe on the bench, said means including two roller elements one being on each side of the longitudinal center of the bench, means for holding the roller elements at different distances from the longitudinal center whereby they may be adjustably positioned closer together or farther apart according to the diameter of the pipe to be supported, and means adjacent the end of the bench for supporting a fitting to be welded to pipe on the bench.

PAUL A. EDWARDS.
MARTIN G. J. GROSS.